US012459462B2

(12) United States Patent
Inoue et al.

(10) Patent No.: US 12,459,462 B2
(45) Date of Patent: Nov. 4, 2025

(54) DEVICE SETTING APPARATUS, DEVICE SETTING SYSTEM, DEVICE SETTING METHOD, AND STORAGE MEDIUM

(71) Applicant: HONDA MOTOR CO., LTD., Tokyo (JP)

(72) Inventors: Yoshiaki Inoue, Tokyo (JP); Naoki Kikuchi, Tokyo (JP); Junya Ishizaki, Tokyo (JP); Yunan Cai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 107 days.

(21) Appl. No.: 18/588,011

(22) Filed: Feb. 27, 2024

(65) Prior Publication Data
US 2024/0326736 A1 Oct. 3, 2024

(30) Foreign Application Priority Data

Mar. 30, 2023 (JP) .................. 2023-055856

(51) Int. Cl.
B60R 25/01 (2013.01)
G06F 8/65 (2018.01)
(52) U.S. Cl.
CPC .................. B60R 25/01 (2013.01)
(58) Field of Classification Search
CPC .......... B60R 25/01; B60R 16/037; G06F 8/65
See application file for complete search history.

(56) References Cited

U.S. PATENT DOCUMENTS

2009/0237715 A1 9/2009 Kasatani
2015/0332519 A1* 11/2015 Hiura ................. G07C 5/08
701/33.4

(Continued)

FOREIGN PATENT DOCUMENTS

JP 2003-130649 5/2003
JP 2008-072160 3/2008

(Continued)

OTHER PUBLICATIONS

Japanese Notice Of Allowance for Japanese Patent Application No. 2023-055856 mailed Nov. 12, 2024.

Primary Examiner — Tan Q Nguyen
(74) Attorney, Agent, or Firm — Amin, Turocy & Watson, LLP

(57) ABSTRACT

A device setting apparatus identifies a user, update operation setting information regarding a plurality of devices stored in a first storage unit regardless of a setting change operation from a user, and upon receiving a setting change operation for at least some of the plurality of devices through a receiver configured to receive an operation from the user, changes an operation setting of the at least some of the plurality of devices according to the setting change operation and causing a second storage unit to store temporary change information that is based on content of the setting change operation, wherein a process of causing the second storage unit to store the temporary change information is performed regardless of a progress state of the update process, the operation setting information and the temporary change information are compared after the update process is completed, and the temporary change information is reflected in the operation setting information when the temporary change information has not been reflected in the operation setting information.

9 Claims, 3 Drawing Sheets

(56) References Cited

U.S. PATENT DOCUMENTS

| | | | |
|---|---|---|---|
| 2016/0036631 A1* | 2/2016 | Shibata | G06F 11/00 |
| | | | 709/221 |
| 2016/0261771 A1 | 9/2016 | Fuji | |
| 2021/0201599 A1* | 7/2021 | Shionoya | G07C 5/0841 |
| 2022/0312191 A1 | 9/2022 | Matsugi et al. | |
| 2022/0410754 A1* | 12/2022 | Sakurai | G06F 8/65 |

FOREIGN PATENT DOCUMENTS

| | | |
|---|---|---|
| JP | 2009-164977 | 7/2009 |
| JP | 2009-260915 | 11/2009 |
| JP | 2016-162314 | 9/2016 |
| JP | 2016-173759 | 9/2016 |
| JP | 2022-152073 | 10/2022 |

* cited by examiner

| USER:AAA | |
|---|---|
| POWER WINDOW | AMOUNT OF OPENING OR CLOSING: xx%/PRESSED DURATION |
| SUNROOF | AMOUNT OF OPENING OR CLOSING: xx%/OPERATED DURATION |
| ... | ... |

DEVICE SETTING APPARATUS, DEVICE SETTING SYSTEM, DEVICE SETTING METHOD, AND STORAGE MEDIUM

CROSS-REFERENCE TO RELATED APPLICATION

Priority is claimed on Japanese Patent Application No. 2023-055856, filed Mar. 30, 2023, the content of which is incorporated herein by reference.

BACKGROUND

Field of the Invention

The present invention relates to a device setting apparatus, a device setting system, a device setting method, and a storage medium.

Description of Related Art

In the related art, individual settings can be configured for devices such as in-vehicle devices and the configured operation setting information is stored in a storage device, and when a device starts operating, its operation setting information is read from the storage device and reflected in the device. In particular, for a device shared by a plurality of users, operation setting information of each individual is stored in a storage device and operation setting information of an identified user is used (Japanese Unexamined Patent Application, First Publication No. 2008-072160 and Japanese Unexamined Patent Application, First Publication No. 2003-130649).

SUMMARY

In the related art, if a user tries to perform a manual operation to change settings while operation setting information is being updated for some reason, it may not be possible to accurately determine whether to use the updated information or the manually changed setting information as the latest and control may be performed so as not to receive a manual operation to change setting due to such concerns. This may cause discomfort to the user.

The present invention has been made in view of such circumstances and it is an object of the present invention to provide a device setting apparatus, a device setting system, a device setting method, and a program that ensure that devices can be operated with a natural feeling of use without causing discomfort to the user.

A device setting apparatus, a device setting system, a device setting method, and a program according to the present invention adopt the following configurations.

(1) A device setting apparatus according to an aspect of the present invention includes a storage medium configured to store computer-readable instructions, and a processor connected to the storage medium, the processor executing the computer-readable instructions to identify a user, update operation setting information regarding a plurality of devices stored in a first storage unit regardless of a setting change operation from a user, and upon receiving a setting change operation for at least some of the plurality of devices through a receiver configured to receive an operation from the user, change an operation setting of the at least some of the plurality of devices according to the setting change operation and causing a second storage unit to store temporary change information that is based on content of the setting change operation, wherein the processor performs a process of causing the second storage unit to store the temporary change information regardless of a progress state of a process of the updating, compares the operation setting information and the temporary change information after the process of the updating is completed, and reflects the temporary change information in the operation setting information when the temporary change information has not been reflected in the operation setting information.

(2) In the device setting apparatus according to the above aspect (1), the processor updates the operation setting information based on information provided from an external apparatus via a communication device.

(3) In the device setting apparatus according to the above aspect (2), the processor instructs the communication device to transmit an update request that is based on the temporary change information to the external apparatus when reflecting the temporary change information in the operation setting information.

(4) In the device setting apparatus according to the above aspect (1), when the user identified by the identifier is switched, the processor updates the operation setting information with operation setting information for the switched user extracted from a group of operation setting information stored in a third storage unit, the group of operation setting information being a collection of the operation setting information for a plurality of users.

(5) In the device setting apparatus according to the above aspect (2), when the user identified by the identifier is switched, the processor updates the operation setting information with operation setting information for the switched user extracted from a group of operation setting information stored in a third storage unit, the group of operation setting information being a collection of the operation setting information for a plurality of users.

(6) A device setting system according to another aspect of the present invention includes the device setting apparatus according to the above aspect (2) and the external apparatus.

(7) A device setting system according to another aspect of the present invention includes the device setting apparatus according to the above aspect (3) and the external apparatus.

(8) A device setting method according to another aspect of the present invention is a device setting method performed using a processor of a device setting apparatus, the device setting method according to another aspect of the present invention includes a process of identifying a user, an update process of updating operation setting information regarding a plurality of devices stored in a first storage unit regardless of a setting change operation from a user, and a setting change process of, upon receiving a setting change operation for at least some of the plurality of devices through a receiver configured to receive an operation from the user, changing an operation setting of the at least some of the plurality of devices according to the setting change operation and causing a second storage unit to store temporary change information that is based on content of the setting change operation, wherein the setting change process is performed regardless of a state of the update process, and the processor compares the operation setting information and the temporary change information after the update process is completed and reflects the temporary change information in the operation setting information when the temporary change information has not been reflected in the operation setting information.

(9) A computer-readable non-transitory storage medium according to another aspect of the present invention is a computer-readable non-transitory storage medium storing a program causing a processor of a device setting apparatus to perform a process of identifying a user, an update process of updating operation setting information regarding a plurality of devices stored in a first storage unit regardless of a setting change operation from a user, and a setting change process of, upon receiving a setting change operation for at least some of the plurality of devices through a receiver configured to receive an operation from the user, changing an operation setting of the at least some of the plurality of devices according to the setting change operation and causing a second storage unit to store temporary change information that is based on content of the setting change operation, wherein the setting change process is performed regardless of a state of the update process, and the program further causes the processor to perform a process of comparing the operation setting information and the temporary change information after the update process is completed and reflecting the temporary change information in the operation setting information when the temporary change information has not been reflected in the operation setting information.

According to the above aspects (1) to (9), devices can be operated with a natural feeling of use without causing discomfort to the user.

BRIEF DESCRIPTION OF THE DRAWINGS

FIG. 2 is a diagram showing an overview of operation setting information.

DESCRIPTION OF EMBODIMENTS

Hereinafter, embodiments of a device setting apparatus, a device setting system, a device setting method, and a program of the present invention will be described with reference to the drawings. The device setting apparatus is an apparatus that configures operation settings of devices. The devices are, for example, devices mounted in a mobile body such as a vehicle. In the following description, it is assumed that the device setting apparatus is mounted in a vehicle.

First Embodiment

Figure 1:
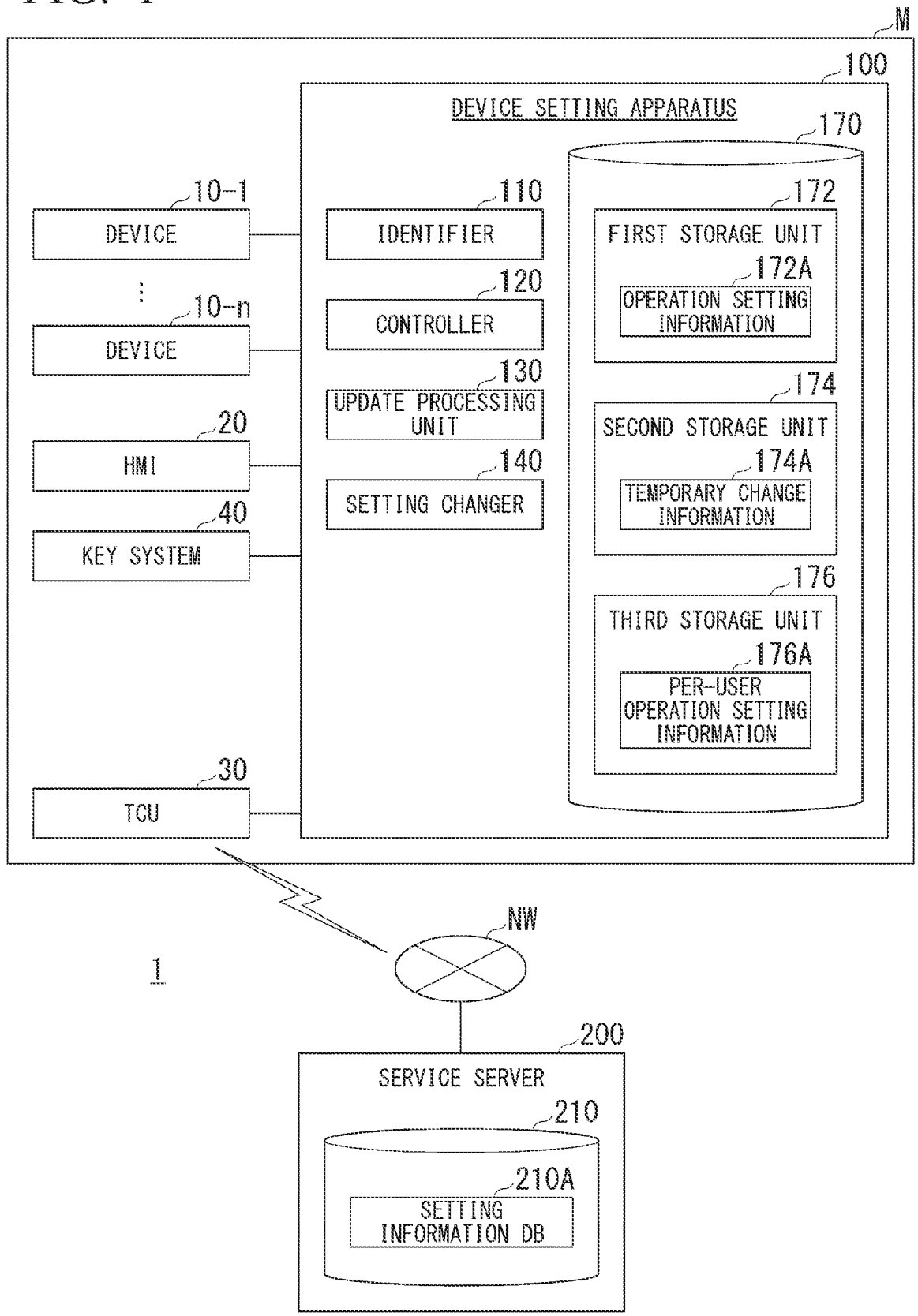
FIG. 1 is a diagram showing an example of a configuration and usage environment of a device setting system including a device setting apparatus according to a first embodiment.

FIG. 1 is a diagram showing an example of a configuration and usage environment of a device setting system 1 including a device setting apparatus 100 according to a first embodiment. The device setting apparatus 100 is mounted in a vehicle M. A plurality of devices 10 #1 to 10 #n, a human machine interface (HMI) 20, a telematics controller (TCU) 30, and a key system 40 are mounted in the vehicle M. General components such as a drive apparatus such as an engine or a motor, a brake device, and a steering device are also mounted in the vehicle M, but illustrations and descriptions thereof will be omitted.

The plurality of devices 10 #1 to 10 #n include, for example, a power window, a sunroof, a sunshade, an interior light, a map light, an air conditioning system, a memory seat, a seat heater/cooler, a door lock, a driving mode setting device, and a driving support device. Each of the plurality of devices #1 to #10 #n may or may not include an electronic controller (ECU) serving as a controlling entity.

The power window is, for example, a device that opens and closes window glass placed on the driver's seat side, the front passenger seat side, and the left and right sides of the rear seats of the vehicle M, and the amount of opening or closing of the window glass, and the like with respect to the amount of pressing and the duration of pressing an open/close switch by the user are set and controlled based on the operation setting information 172A. The sunroof is, for example, a device that opens and closes a glass or steel panel in an opening placed in the roof of the interior of the vehicle M, and the amount of opening or closing the glass or steel panel and the like with respect to an operation from a user are set and controlled based on the operation setting information 172A. The sunshade is, for example, a device that opens and closes a light shielding portion that blocks sunlight entering through the rear window glass of the vehicle M or the right and left window glass of the rear seats, and the amount of opening or closing the light shielding portion and the like with respect to an operation from a user are set and controlled based on the operation setting information 172A. Each of the interior light and the map light is a device (a lighting device) for illuminating the interior of the vehicle M and the user's hands, and turning on and off, brightness when turned on, and the like thereof are set and controlled based on the operation setting information 172A. The air conditioning system is, for example, a device (an air conditioning apparatus) such as an air conditioner, and the temperature, air volume, and the like of air (an airflow) to be sent into the interior of the vehicle M are set and controlled based on the operation setting information 172A. The memory seat is a device that adjusts the positions of seats on the driver's seat side, such as the positions and heights of their seat surfaces and the angles of their backrests, such that they become positions (so-called seat positions) that the user desires when driving the vehicle M, and the positions of the seats on the driver's side are set and controlled based on the operation setting information 172A. The seat heater/cooler is, for example, a device that adjusts the temperatures of seats on the driver's seat side (which may include the front passenger seat and the rear seats), and the temperature adjustment functions of the seats are set and controlled based on the operation setting information 172A. The door lock is, for example, a device including a security function that operates when a user exits and walks away from the vehicle M, and the operation mode of the security function and the like are set and controlled based on the operation setting information 172A. The driving mode setting device is, for example, a device that changes various setting items relating to traveling (driving) of the vehicle M, such as an automated driving travel mode, a normal travel mode, a sport travel mode, and a comfort travel mode, and the setting items of each driving mode or travel mode are set and controlled based on the operation setting information 172A. The driving support device 213 is, for example, a device that changes various setting items relating to driving support functions, represented by an active safety function that combines an anti-lock braking system (ABS) function, a traction control system (TCS), a sideslip prevention function, and the like to suppress sudden changes in the behavior of the vehicle M, an adaptive cruise control (ACC) system, a lane keeping assistance system (LKAS), or the like, and the setting items of the driving support functions are set and controlled based on the operation setting information 172A.

The HMI 20 is an apparatus or device for presenting information to users (occupants) and receiving operations from the occupants. The HMI 20 includes, for example, a touch panel display device and various switches (for example, steering switches provided on a steering wheel).

The TCU 30 is a communication device including a wireless communication module. The TCU 30 includes, for example, a 4G-radio frequency (RF) circuit, a 5G-RF circuit, a dedicated short range communications (DSRC)-RF circuit, a GPS circuit, an antenna, and a control circuit. TCU 30 communicates with a service server 200 via a network NW. The service server 200 is an example of an external apparatus.

The key system 40 is a system that detects a signal from a smart key or an FOB key and permits unlocking of doors and starting of the drive apparatus. The key system 40 may have a function of identifying an occupant based on identification information of a key used.

The device setting apparatus 100 includes, for example, an identifier 110, a controller 120, an update processing unit 130, a setting changer 140, and a storage unit 170. The storage unit 170 includes, for example, a first storage unit 172 that stores operation setting information 172A, a second storage unit 174 that stores temporary change information 174A, and a third storage unit 176 that stores per-user operation setting information 176A. Components other than the storage unit 170 are each implemented, for example, by a hardware processor such as a central processing unit (CPU) executing a program (software). Some or all of these components may be implemented by hardware (including circuitry) such as a large scale integration (LSI), an application specific integrated circuit (ASIC), a field-programmable gate array (FPGA), or a graphics processing unit (GPU) or may be implemented by software and hardware in cooperation. The program may be stored in a storage device (a storage device including a non-transitory storage medium) such as a hard disk drive (HDD) or a flash memory in advance or may be stored in a detachable storage medium (a non-transitory storage medium) such as a DVD or a CD-ROM and then installed by mounting the storage medium in a drive device. The storage unit 170 is implemented by a random access memory (RAM), an HDD, or a flash memory.

The identifier 110 identifies a user, that is, an occupant of the vehicle M, more specifically, a driver. In the following description, it is assumed that the user is a driver. For example, the identifier 110 identifies an occupant identified by the key system 40 as a driver. The identifier 110 may also identify the driver based on an operation performed on the HMI 20 or may identify the driver based on biometric information or security information read by an authentication apparatus (not shown) or may identify the driver by analyzing an image captured by a driver monitor camera (not shown).

For example, when the system of the vehicle M is started, the controller 120 reads information corresponding to the driver identified by the identifier 110 from the operation setting information 172A and configures operation settings of the plurality of devices 10 #1 to 10 #n based on the read information. FIG. 2 is a diagram showing an overview of the operation setting information 172A. The operation setting information 172A is operation setting information corresponding to the currently active user. Note that the per-user operation setting information 176A is a collection of operation setting information of users.

The update processing unit 130 updates the operation setting information 172A regardless of a setting change operation from the driver. The update processing unit 130 performs such an update process, for example, in cases where it becomes necessary to change items of the operation setting information 172A in accordance with an update program when the update program or the like has been acquired from the service server 200 via the TCU 30. When the driver identified by the identifier 110 is switched, the update processing unit 130 may update the operation setting information 172A with operation setting information of the switched user extracted from the per-user operation setting information 176A. Information corresponding to the per-user operation setting information 176A may not be held by the device setting apparatus 100, but may be held exclusively by the service server 200. The service server 200 causes the storage unit 210 to store a setting information database 210A. The setting information database 210A is a collection of operation setting information of users for each vehicle. In this case, the third storage unit 176 may be omitted.

Upon receiving a setting change operation for at least some of the plurality of devices 10 #1 to 10 #n through the HMI 20, the setting changer 140 changes an operation setting of the at least some of the plurality of devices 10 #1 to 10 #n according to the setting change operation regardless of the state of the update processing unit 130 and causes the second storage unit 174 to store temporary change information that is based on the content of the setting change operation as temporary change information 174A. The temporary change information 174A is set for each driver (for each user).

Figure 3:
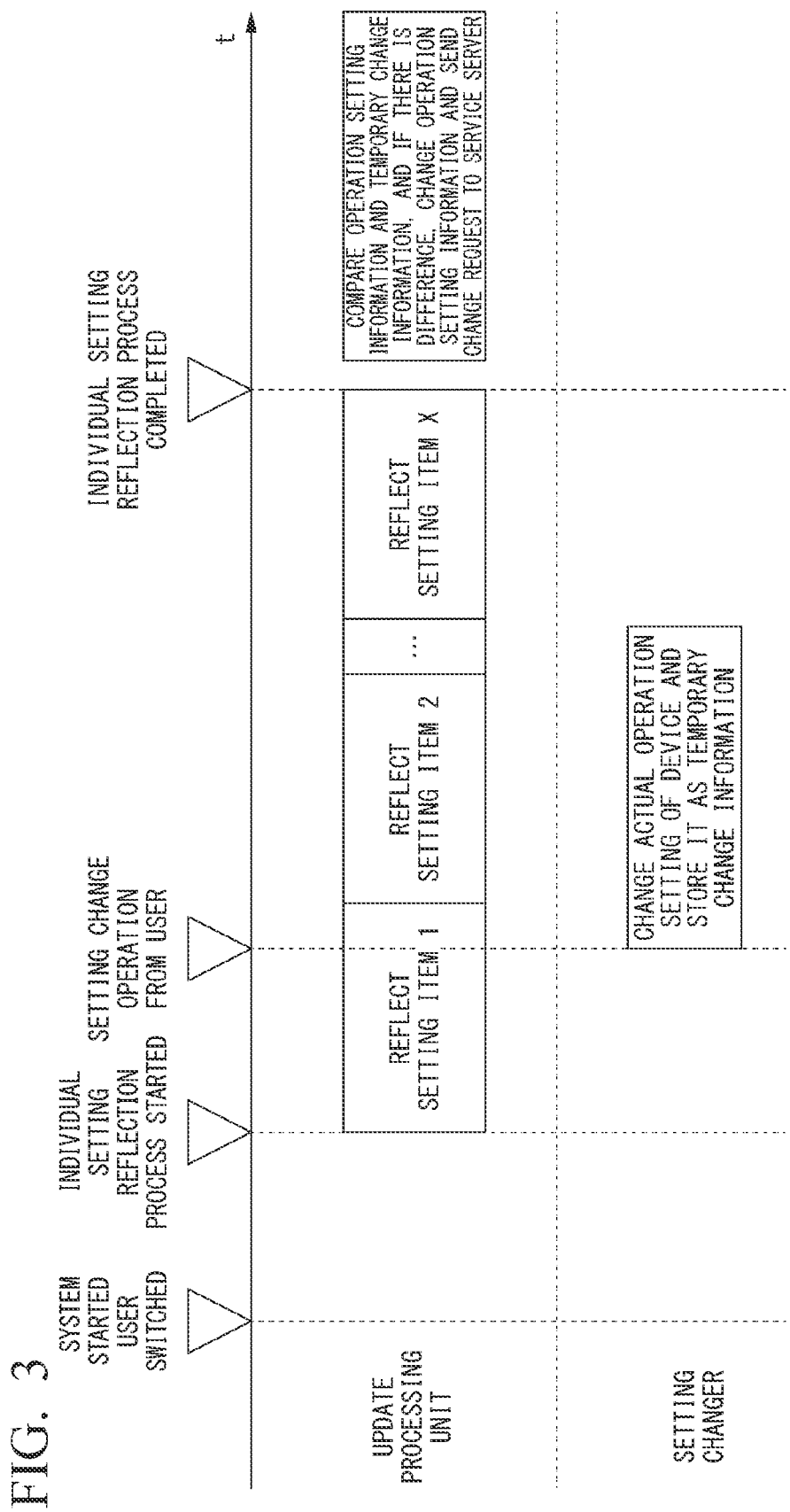
FIG. 3 is a time chart showing an example of a flow of processing when processing of an update processing unit and processing of a setting changer overlap.

FIG. 3 is a time chart showing an example of a flow of processing when processing of the update processing unit 130 and processing of the setting changer 140 overlap. As a premise for the description of FIG. 3, it is assumed that the update processing unit 130 performs an update process when the driver identified by the identifier 110 is switched and that information corresponding to the per-user operation setting information 176A is held exclusively by the service server 200.

First, when the system of the vehicle M is started and the user identified by the identifier 110 is switched, the update processing unit 130 starts an update process (an individual setting reflection process). The update processing unit 130 requests transmission of operation setting information regarding the current user from the service server 200 via the network NW. The update processing unit 130 sequentially performs an update process for each setting item. If a setting change request is made by the user before the update process is completed, the setting changer 140, in parallel with the update processing unit 130, instructs a target device to change actual operation settings of the device and causes the second storage unit 174 to store the content of the change as temporary change information 174A.

When the individual setting reflection process is completed, the update processing unit 130 first compares the operation setting information 172A and the temporary change information 174A, and when there is a difference (an updated part) (when the temporary change information 174A has not been reflected in the operation setting information 172A), changes the operation setting information 172A such that it matches the temporary change information 174A and further requests the service server 200 to change operation setting information of the user. At this time, if the per-user operation setting information 176A is exclusively held in the third storage unit 176, the update processing unit 130 changes the operation setting information 172A and the per-user operation setting information 176A for the user. If the per-user operation setting information 176A is held in the third storage unit 176 and the same information is held in the service server 200, the update processing unit 130 updates the operation setting information 172A and the per-user operation setting information 176A for the user and requests the service server 200 to change the operation setting information of the user.

Performing such processing can prevent the occurrence of a period during which a setting change request is not reflected even though a user has made the request and ensures that devices can be operated with a natural feeling of use without causing discomfort to the user.

Although the mode for carrying out the present invention has been described above by way of embodiments, the present invention is not limited to these embodiments at all and various modifications and substitutions may be made without departing from the spirit of the present invention.

What is claimed is:

1. A device setting apparatus comprising:
   a storage medium configured to store computer-readable instructions; and
   a processor connected to the storage medium, the processor executing the computer-readable instructions to:
   identify a user;
   update operation setting information regarding a plurality of devices stored in a first storage unit regardless of a setting change operation from a user; and
   upon receiving a setting change operation for at least some of the plurality of devices through a receiver configured to receive an operation from the user, change an operation setting of the at least some of the plurality of devices according to the setting change operation and causing a second storage unit to store temporary change information that is based on content of the setting change operation,
   wherein the processor performs a process of causing the second storage unit to store the temporary change information regardless of a progress state of a process of the updating, compares the operation setting information and the temporary change information after the process of the updating is completed, and reflects the temporary change information in the operation setting information when the temporary change information has not been reflected in the operation setting information.

2. The device setting apparatus according to claim 1, wherein the processor updates the operation setting information based on information provided from an external apparatus via a communication device.

3. The device setting apparatus according to claim 2, wherein the processor instructs the communication device to transmit an update request that is based on the temporary change information to the external apparatus when reflecting the temporary change information in the operation setting information.

4. A device setting system comprising:
   the device setting apparatus according to claim 3; and
   the external apparatus.

5. The device setting apparatus according to claim 2, wherein, when the user identified by the identifier is switched, the processor updates the operation setting information with operation setting information for the switched user extracted from a group of operation setting information stored in a third storage unit, the group of operation setting information being a collection of the operation setting information for a plurality of users.

6. A device setting system comprising:
   the device setting apparatus according to claim 2; and
   the external apparatus.

7. The device setting apparatus according to claim 1, wherein, when the user identified by the identifier is switched, the processor updates the operation setting information with operation setting information for the switched user extracted from a group of operation setting information stored in a third storage unit, the group of operation setting information being a collection of the operation setting information for a plurality of users.

8. A device setting method performed using a processor of a device setting apparatus, the device setting method comprising:
   a process of identifying a user;
   an update process of updating operation setting information regarding a plurality of devices stored in a first storage unit regardless of a setting change operation from a user; and
   a setting change process of, upon receiving a setting change operation for at least some of the plurality of devices through a receiver configured to receive an operation from the user, changing an operation setting of the at least some of the plurality of devices according to the setting change operation and causing a second storage unit to store temporary change information that is based on content of the setting change operation,
   wherein the setting change process is performed regardless of a state of the update process, and
   the processor compares the operation setting information and the temporary change information after the update process is completed and reflects the temporary change information in the operation setting information when the temporary change information has not been reflected in the operation setting information.

9. A computer-readable non-transitory storage medium storing a program causing a processor of a device setting apparatus to perform:
   a process of identifying a user;
   an update process of updating operation setting information regarding a plurality of devices stored in a first storage unit regardless of a setting change operation from a user; and
   a setting change process of, upon receiving a setting change operation for at least some of the plurality of devices through a receiver configured to receive an operation from the user, changing an operation setting of the at least some of the plurality of devices according to the setting change operation and causing a second storage unit to store temporary change information that is based on content of the setting change operation,
   wherein the setting change process is performed regardless of a state of the update process, and
   the program further causes the processor to perform a process of comparing the operation setting information and the temporary change information after the update process is completed and reflecting the temporary change information in the operation setting information when the temporary change information has not been reflected in the operation setting information.

* * * * *